US006953194B2

(12) United States Patent
Brockway

(10) Patent No.: US 6,953,194 B2
(45) Date of Patent: Oct. 11, 2005

(54) EXPANDABLE BAND AND LOCKING MECHANISM

(75) Inventor: Robert D. Brockway, Bedford, NH (US)

(73) Assignee: NPC, Inc., Milford, NH (US)

( * ) Notice: Subject to any disclaimer, the term of this patent is extended or adjusted under 35 U.S.C. 154(b) by 0 days.

(21) Appl. No.: 10/348,400

(22) Filed: Jan. 21, 2003

(65) Prior Publication Data

US 2004/0021317 A1 Feb. 5, 2004

Related U.S. Application Data

(63) Continuation-in-part of application No. 10/210,194, filed on Jul. 31, 2002.

(51) Int. Cl.[7] .................................................. F16L 21/00

(52) U.S. Cl. ........................ 277/576; 277/616; 285/236

(58) Field of Search ................................ 277/606–616, 277/576; 285/365, 407, 420, 236, 237, 230

(56) References Cited

U.S. PATENT DOCUMENTS

| | | | |
|---|---|---|---|
| 3,432,188 A | 3/1969 | Turner | 285/197 |
| 3,490,794 A | 1/1970 | Swanson | 285/173 |
| 3,516,446 A | 6/1970 | O'Hargan et al. | 138/97 |
| 3,700,265 A | 10/1972 | Dufour et al. | 285/15 |
| 3,813,116 A | 5/1974 | Horsley | 285/236 |
| 3,825,286 A | 7/1974 | Henry, III | 285/93 |
| 3,840,053 A | 10/1974 | Sluga | 138/97 |
| 3,899,183 A | 8/1975 | Wild et al. | 277/101 |
| 3,933,377 A | 1/1976 | Arrowood | 285/61 |
| 3,958,313 A | 5/1976 | Rossborough | 29/157 R |
| 3,960,395 A | 6/1976 | Cirule et al. | 285/370 |
| 4,059,293 A | 11/1977 | Sipler | 285/236 |
| 4,107,454 A | 8/1978 | Jakobsen | 174/135 |
| 4,215,868 A | 8/1980 | Skinner et al. | 277/1 |
| 4,303,103 A | 12/1981 | Marks et al. | 138/97 |

(Continued)

FOREIGN PATENT DOCUMENTS

| | | | |
|---|---|---|---|
| EP | 0021454 | 1/1981 | 21/2 |

*Primary Examiner*—Daniel P. Stodola
*Assistant Examiner*—Christopher J. Boswell
(74) *Attorney, Agent, or Firm*—Bourque & Assoc.

(57) ABSTRACT

The expandable band is used to secure a sealing element within a generally cylindrical structure, such as a pipe or manhole, or other round hole. The expandable band includes a band body having a first band end portion and a second band end portion. The first band end portion includes a plurality of slots, and the second band end portion includes a first and second aperture. A locking member is a separate element adapted to fit within the first and second apertures and includes a first tab for extending through the first aperture and into one of the plurality of slots to lock the expandable band at the desired diameter and a second tab for engaging the second aperture. The second tab is designed not to interfere with the first band end portion while expanding the band. The locking member may also include at least one rib or protrusion.

27 Claims, 7 Drawing Sheets

U.S. PATENT DOCUMENTS 4,305,679 A 12/1981 Modi .......................... 404/25
4,346,922 A 8/1982 Ohtsuga et al. ............. 285/109
4,449,715 A 5/1984 Gagas ......................... 277/12
4,469,467 A 9/1984 Odill et al. ................... 404/25
4,475,845 A 10/1984 Odill et al. ................... 404/25
4,478,437 A 10/1984 Skinner ...................... 285/159
4,543,691 A 10/1985 Calmettes ...................... 24/20
4,621,941 A 11/1986 Ditcher et al. ................ 404/26
4,705,305 A 11/1987 Ghaly ........................ 285/311
4,737,220 A 4/1988 Ditcher et al. .............. 156/218
4,746,127 A 5/1988 Westhoff et al. ............... 277/1
4,890,863 A 1/1990 Westhoff et al. .............. 285/39
4,903,970 A 2/1990 Ditcher et al. ............... 277/9.5
4,911,380 A 3/1990 Regipa ........................ 244/31
4,954,004 A 9/1990 Faber et al. .................. 403/13
5,020,832 A 6/1991 Coblentz .................... 285/197
5,029,907 A 7/1991 Gundy ....................... 285/158
5,054,794 A 10/1991 Westhoff et al. ............... 277/1
5,150,927 A 9/1992 Skinner ...................... 285/189
5,209,601 A 5/1993 Odill et al. ................... 404/26
5,333,360 A * 8/1994 Oetiker ....................... 24/20 R
5,360,241 A 11/1994 Gundy ....................... 285/197
5,431,459 A 7/1995 Gundy ....................... 285/237
5,496,128 A 3/1996 Odill ........................... 404/25
5,732,955 A * 3/1998 Skinner et al. ............. 277/602
5,738,359 A 4/1998 Gundy ....................... 277/606
6,152,455 A 11/2000 Brockway et al. .......... 277/576
6,607,219 B2 * 8/2003 Mirales et al. .............. 277/576
6,866,301 B2 * 3/2005 Brockway ................... 285/236

* cited by examiner

EXPANDABLE BAND AND LOCKING MECHANISM

CROSS-REFERENCE TO RELATED APPLICATIONS

This application is a continuation-in-part of co-pending patent application Ser. No. 10/210,194 filed on Jul. 31, 2002, which is fully incorporated herein by reference.

TECHNICAL FIELD

The present invention relates to expandable bands and locking mechanisms for such bands and more particularly, to an expandable band having slots at one end and a locking member at the other end to engage one of the slots and lock the band at the desired diameter.

BACKGROUND INFORMATION

Expandable bands are commonly used to secure flexible sealing elements or gaskets against an internal surface of a pipe, manhole, or other similar structure. Expandable bands typically fit against an annular surface within the sealing element and are expanded to apply pressure against the sealing element. Various types of locking mechanisms are used to lock the band into the expanded position against the sealing element.

The existing bands and locking mechanisms, however, have a number of limitations and disadvantages. Many of the existing expandable bands are expandable to only one diameter and therefore have a limited overall expansion range. Many of these bands also require a number of steps to both expand and lock the band and are not capable of quickly and securely locking the band over a range of diameters. Moreover, other existing bands do not slide easily or bind when being installed or adjusted. Overall, the existing bands are not useful with seals of various sizes that need to be installed in pipes or manholes having various sizes.

Accordingly, a need exists for an expandable band that is easily adjusted and securely locks over a range of diameters. A need also exists for an expandable band that is more easily released from a locking position.

SUMMARY OF THE INVENTION

The present invention features an expandable band comprising a band body having a first band end portion and a second band end portion. A plurality of slots are disposed in the first band end portion of the band body; and a first and a second aperture are disposed in the second band end portion. A locking member includes a first tab (also known and referred to herein as a latch) adapted to extend through the first aperture in the second band end portion and into one of the plurality of slots to lock the expandable band at a desired diameter and a second tab adapted to engage the second aperture in the second band end portion. The second band end portion of the band body includes an end section that extends beyond the tab of the locking member.

The first and second band end portions of the band body preferably overlap to form a generally annular shape with the second band end portion. The first tab of the locking member preferably extends inwardly with respect to the band to engage one of the plurality of slots and forms an obtuse angle with respect to a plane tangential to the second band end portion of the band body. The second tab of the locking member is sized to engage the second aperture of the second band end portion, but not to interfere with the first band end portion.

In one embodiment, the band body has a generally U-shaped cross-section such that the band body includes a base portion and side portions extending from the base portion. The plurality of slots are disposed in the base portion of the band body. At least part of the first and second band end portions also preferably have a generally U-shaped cross-section, and the first band end portion has a narrower width than the second band end portion such that the first band end portion fits within the U-shaped cross-section of the second band end portion. In the preferred embodiment, the second band end portion has the U-shaped cross-section on each side of the tab.

The end section of the second band end portion also preferably has a flat cross-section extending from and one-piece with the section of the second end portion having the U-shaped cross-section. Alternatively, the second band end portion can include a separate extension member having the flat cross-section and attached to the section of the second band end portion having the U-shaped cross-section.

In the preferred embodiment, the band body has a generally "W shaped" or "wave shaped" cross-section. The first and second band end portions "nest" on each other and do not need to be "necked down". The first and second band end portions include at least two "V" shaped side portions extending from a base portion.

In one embodiment, the first band end portion having the plurality of slots is one piece with the band body. In another embodiment, the first band end portion includes a separate piece attached to the band body and having the plurality of slots. In a preferred embodiment, the locking member includes at least one rib or protrusion.

The preferred embodiment of the expandable band further includes an engaging element disposed on an inside surface of the band body, for engaging with a band expansion mechanism. In one example, the engaging element includes a block (also referred to as a jacking pad) attached to the inside surface of the band body.

The present invention also features a sealing system comprising a resilient sealing member for sealing an internal surface of a cylindrical structure and one or more expandable bands.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
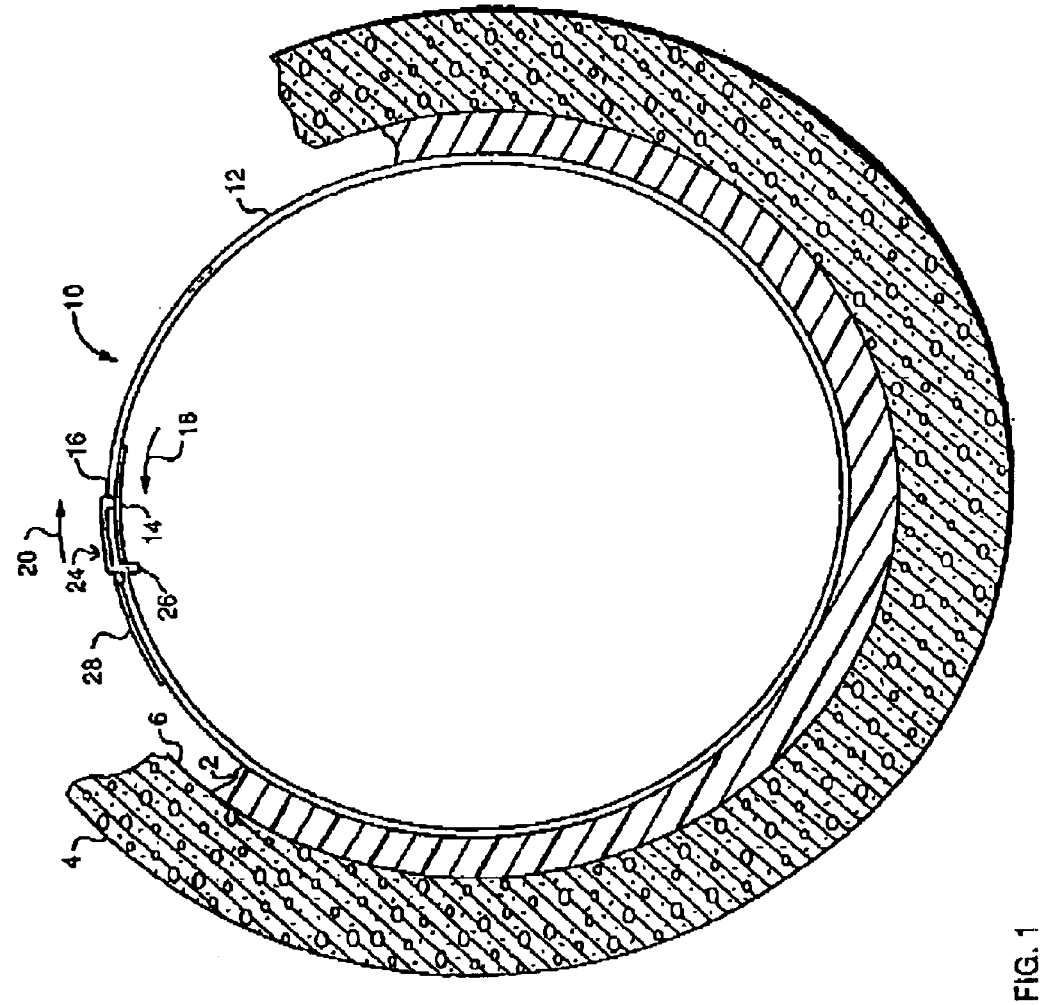
FIG. 1 is a partial cross-sectional side view of an expandable band, according to the present invention, installed within a sealing element.

An expandable band 10, FIG. 1, according to the present invention, is used to secure a sealing element 2, such as a rubber seal or gasket, in the interior of a round structure 4, such as a pipe or manhole, or a round hole through the wall of a structure. The expandable band 10 expands outwardly to secure the sealing element 2 against the internal surface 6 of the cylindrical structure 4. The expandable band 10 locks in the desired expanded position within a range of diameters, as will be described in detail below. Although the exemplary embodiment shows a sealing element 2 and cylindrical structure 4, the present invention contemplates various other uses for the expandable band 10 with other types of structures of different shapes.

The expandable band 10 generally includes a band body 12 having a first band end portion 14 and a second band end portion 16. The first and second end portions 14, 16 of the band body 12 preferably overlap to form a generally annular shaped band. When the band is expanded, the first and second band end portions 14, 16 move in opposite directions as shown by the direction of arrows 18, 20 respectively. In a preferred embodiment, the expandable band 10 is made of 304 or 316 stainless steel or any other suitable material.

Figure 2:
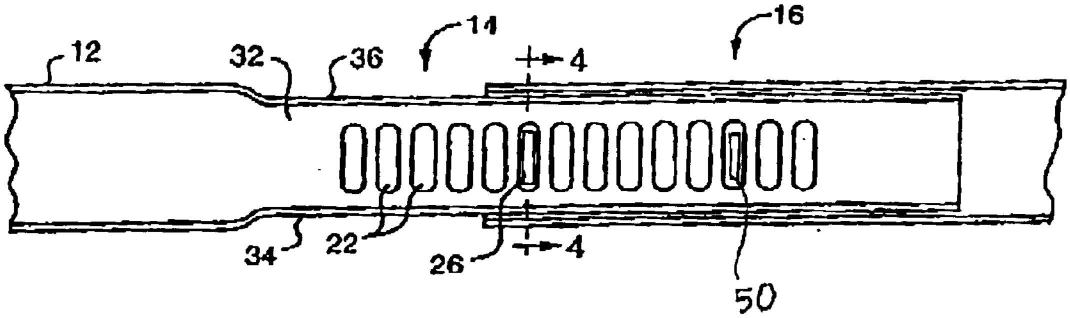
FIG. 2 is a bottom plan view of overlapping first and second end portions of the expandable band, according to the present invention.
Figure 5:
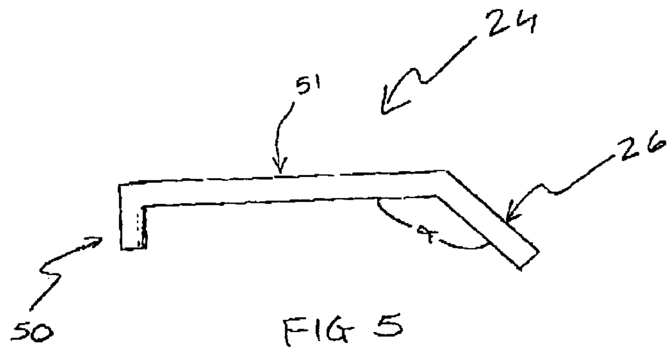
FIG. 5 is a side view of another embodiment of the locking member according to the present invention.
Figure 6:
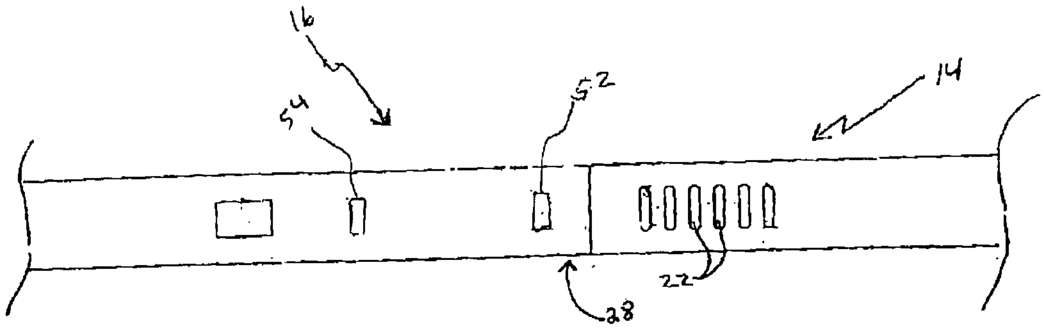
FIG. 6 is a top view of another embodiment of the band body according to the present invention.

According to the preferred embodiment, a plurality of slots 22, FIG. 2, are stamped, milled, or otherwise disposed in the first band end portion 14. In one example, the slots 22 have a generally rectangular shape with a radius at each end and preferably have a width of about 0.125 in., a length of about 0.625 in and a spacing of about 0.3125 in. The present invention contemplates other shapes and sizes for the slots 22. The expandable band 10, FIG. 1, also includes a locking member (also referred to herein as a tab or latch) 24. The locking member 24, FIG. 5, is a separate and distinct element from the band body 12 and includes a first and a second tab 26, 50. The second band end portion 16, FIG. 6, of the band body 12 includes a first and a second aperture 52, 54 that are sized and spaced to accept the first and second tab 26, 50 respectively of the locking member 24. The second band end portion 16 also preferably includes an end section 28 that extends to a point beyond the tab 26 of the locking member 24 to ease the transition at the second end portion 16 where the second end portion 16 overlaps the first end portion 14.

The first tab 24, FIG. 5, is disposed at an angle □ from the main section 51 and is adapted to extend generally inwardly with respect to the band 10 through the first aperture 52 in the second band end portion 16 and engage one of the slots 22 of the first band end portion 14. The second tab 50 is disposed substantially at a 90-degree angle to the main section 51 and is adapted to engage the second aperture 54 in the second band end portion 16. The second tab 50 is sized so that it preferably does not interfere with (engage) the first band end portion 14. In the preferred embodiment, the second tab 50 has approximately the same length as the thickness of the second band end portion 16 such that the second tab 50 extends into, but not completely through, the second aperture 54 in the second band end portion 16.

Figure 7A:
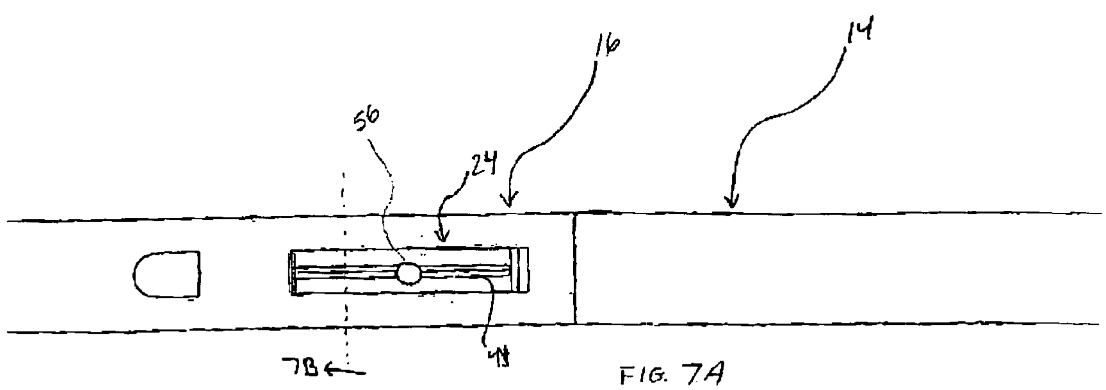
FIG. 7A is a top view of another embodiment of the overlapping first and second band end portions according to the present invention.

The tab 24, FIG. 7A, may also include a rivet, snap, adhesive, or other device 56 that temporarily secures the tab 24 to the second 16 and/or first 14 band end portions. Because the tab 24 and the expandable band 10 are contained as a single piece, the rivet 56 allows the expandable band 10 to be easily and compactly stored and installed. The rivet 56 is designed to release or break apart when the user installs the expandable band 10 thus allowing the expandable band 10 to be expanded.

Figure 7B:
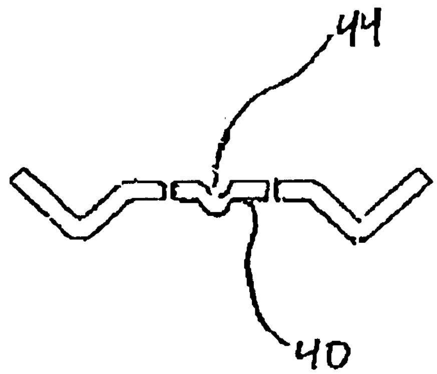
FIG. 7B is a cross-sectional view of one embodiment of the semi-rigid strip, according to the present invention, taken along the line 7B in FIG. 7A.

The locking member 24, FIGS. 7A–B, optionally includes at least one rib or protrusion 44. The rib 44 increases the rigidity and strength of the locking member 24 and may be stamped, milled, pressed, welded, "punched-out", adhered or otherwise disposed from or onto the locking member 24.

According to one embodiment, the first band end portion 14, FIG. 2, is one piece with the band body 12. Alternatively, the first band end portion 14, FIG. 3, may include a separate piece 30 that is welded, crimped, glued, or otherwise attached to the band body 12. The first band end portion 14 includes a generally solid essentially flat piece of material (e.g. having a thickness of about 0.188 to 0.250 inches thick) or, as discussed below, may include cross-sections having alternative shapes.

Figure 3:
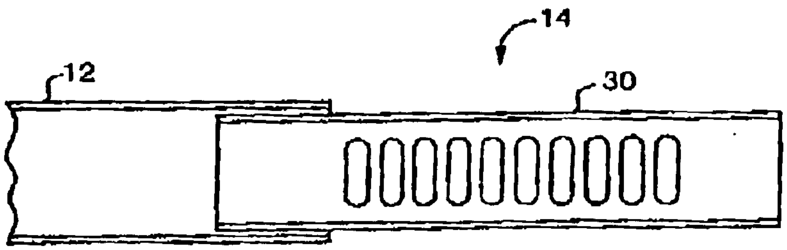
FIG. 3 is a bottom plan view of a first end portion of the expandable band, according to an alternative embodiment of the present invention.
Figure 4A:
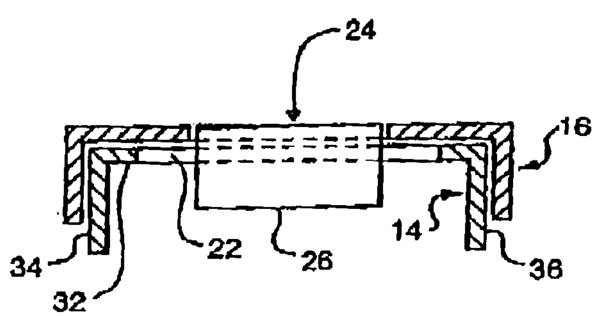
FIG. 4A is a cross-sectional view of the expandable band of the present invention taken along line 4—4 in FIG. 2.

According to one embodiment, either the first and/or/the second band end portions 14, 16, FIG. 4A, also has a generally U-shaped cross-section. The first band end portion 14 includes a base portion 32 and side portions 34, 36 extending from the base portion 32 to form the U-shaped cross section. The plurality of slots 22 are disposed in the base portion 32. The first band end portion 14 preferably has a narrower width than the second band end portion 16 such that the first band end portion 14 fits (or nests) within the U-shaped cross-section of the second band end portion 16. As shown best in FIG. 2, the first band end portion 14 is preferably "necked down" from the band body 12 to form the narrower width. In the embodiment of FIG. 3, the separate piece 30 attached to the band body 12 to form the first band end portion 14 has the narrower width.

Figure 4B:
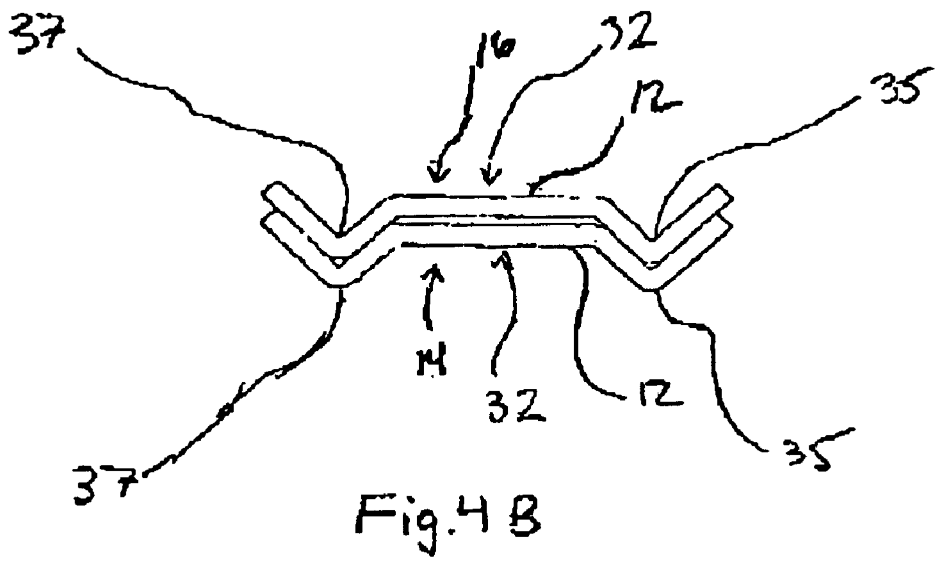
FIG. 4B is a cross-sectional view of the expandable band of the present invention having a W shaped cross section.

In a preferred embodiment, at least a part of the first and second band end portions 14, 16, FIG. 4B, have a generally W shaped or wave shaped cross-section wherein the first and second band end portions 14, 16 "nest" on each other and do not need to be "necked down". The first and second band end portions 14, 16 include at least two V shaped side portions 35, 37 extending from a base portion 32. The plurality of slots 22 are disposed in the base portion 32.

In the embodiment wherein the expandable band 10, FIG. 4A, has a U shaped cross-section, the operating ranging of the expandable band 10 is limited, in part, by the size of the "necked down" portion. This is because the first band end portion 14 must fit within the U-shaped cross-section of the second band end portion 16. In contrast, in the embodiment wherein the expandable band 10, FIG. 4B, has a W shaped cross-section, the first band end portion 14 does not need to fit within the second band end portion 16. Accordingly, an expandable band 10 having a W shaped cross-section can operate over a wider range of sizes than an expandable band having other known cross-section areas. It is important to note, however, that the present invention is not limited to either U or W shaped cross-sections and contemplates various other types of cross-sections for the band body 12 and first and second band end portions 14, 16 including, but not limited to, a C-shaped cross-section, a corrugated cross-section, and a flat cross-section.

Figure 8:
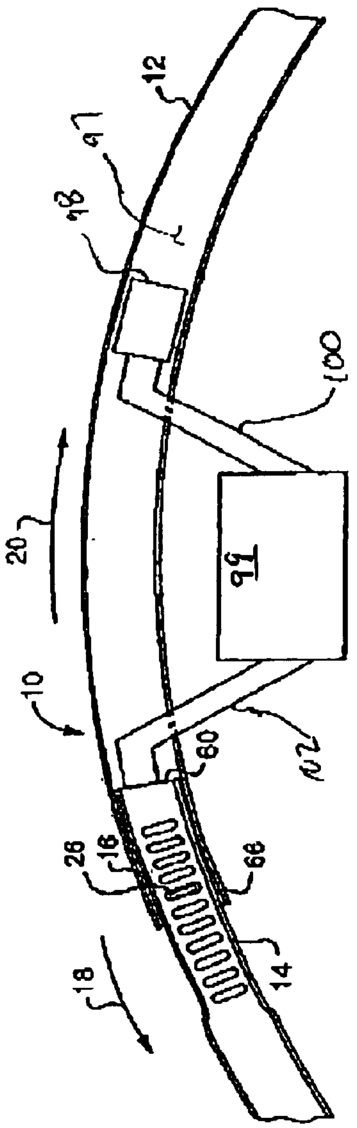
FIG. 8 is a schematic view of the expandable band and an expansion mechanism used to expand the expandable band, according to the exemplary embodiment of the present invention.

The expandable band 10, FIG. 8, may further include an engaging element 98, such as a block or jacking pod, attached to an inside surface 97 of the band body 12. According to one method of use, a band expansion mechanism 99 is used to expand the expandable band 10. Expanding members 100, 102 of the expansion mechanism 99 are engaged with the engaging element 98 and an end face 60 of the first band end portion 14 to cause the first and second band end portions 14, 16 to move in the direction of arrows 18, 20. The present invention also contemplates other types of engaging elements 98, such as a hole or aperture in the band body 12. The present invention further contemplates other types of band expansion mechanisms.

Figure 9:
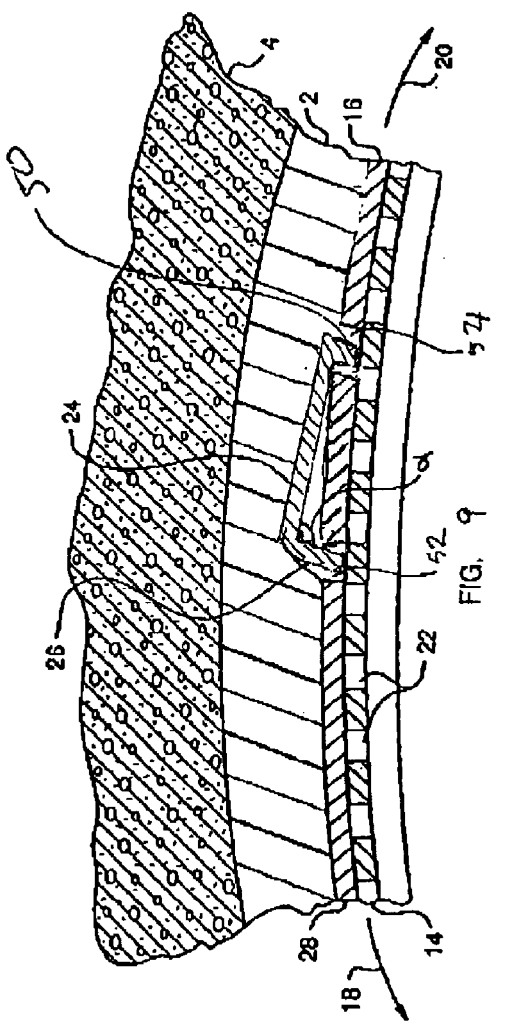
FIG. 9 is a cross-sectional view of another embodiment of the overlapping first and second band end portions as the expandable band is being expanded, according to the present invention.

As the band is expanded, the deformability of sealing element 2 allows the tab 26, FIG. 9, to be disengaged from the slots 22 in the first band end portion 14, allowing the first and second band end portions 14, 16 to easily slide relative to one another in the directions of arrows 18, 20 without the necessity of first band end portion having to "lift" out of engagement with tab 26.

Figure 10:
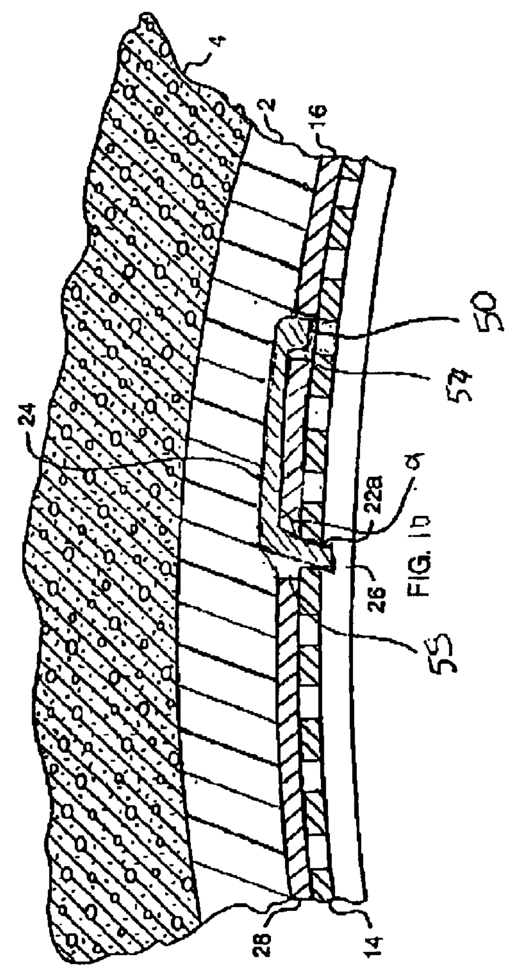
FIG. 10 is a cross-sectional view of another embodiment of the overlapping first and second band end portions of the expandable band in a locked position, according to the present invention.

When the desired diameter of expansion is reached, the first tab 26, FIG. 10, will engage the slot 22*a* at the desired diameter and the second tab 50 will engage the second aperture 54, thereby locking the band 10 by preventing relative movement between the first and second band end portions 14, 16. The angle $\alpha$ of the first tab 26 allows the first tab 26 to easily slide out of engagement with the slots 22 when the band 10 is expanded and facilitates locking of the tab within the slot 22*a*.

The pressure applied by the sealing element 2 against the locking member 24 and the second tab 50 holds the first tab 26 in the slot 22*a*. By having the locking member 24 disposed on the outside of the second band end portion 16 against sealing element 2 with the first and second tabs 26, 50 facing generally inwardly, the sealing element 2 provides a resilient or spring-loaded backing for the tabs 26, 50. This resilient backing allows the end portions 14, 16 of the band 10 to slide easily without binding. Moreover, since the locking member 24 is a separate element from the band body 12, the locking member 24 may be constructed from stronger, more rigid materials than the expandable band body 12 which must be flexible enough to be extended over a range of diameters. As a result, the expandable band 10 can create a tighter seal against the interior of a structure 4 and fit a wider range of diameters.

Figure 8A:
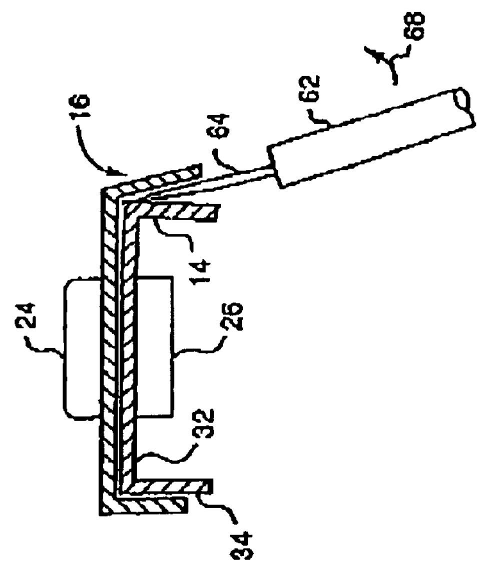
FIG. 8A is a cross-sectional view of the expandable band being disengaged with a tool, according to one method of the present invention.

According to one method of disengaging the expandable band 10, a tool 62, FIG. 8A, similar to a screwdriver is used. A flat head 64 of the tool 62 is inserted into the gap 66 forward of the tab 26 (FIG. 8) and between the first and second band end portions 14, 16, for example, between the sides that form the U-shaped cross section. The tool is then pivoted generally in the direction of arrow 68 such that the flat head 64 lifts the inner, first band end portion 14 away from the outer, second band end portion 16 until the first tab 24 is released from engagement with the slot 22*a*. If necessary, additional impact force can be applied to the tool 62, for example, with a hammer.

Accordingly, the expandable band 10 of the present invention is capable of expanding to and effectively locking at a wider range of diameters. The expandable band 10 of the present invention also creates a tighter seal against the interior of a structure 4. Furthermore, the expandable band 10 of the present invention facilitates the disengagement of the expandable band 10 for removal as well as the installation and adjustment of the expandable band 10.

Modifications and substitutions by one of ordinary skill in the art are considered to be within the scope of the present invention, which is not to be limited except by the following claims.

The invention claimed is:

1. An expandable band comprising:

a band body having a first band end portion and a second band end portion, wherein said first band end portion and said second band end portion overlap to form a generally annular shape;

a plurality of sequential slots disposed in said first band end portion of said band body;

a first and a second aperture disposed in said second band end portion;

a locking member having a first and a second tab disposed proximate a first and a second end portion of said locking member, said first tab adapted to extend through said first aperture in said second band end portion and into one of said plurality of slots to lock said expandable band at a desired diameter, said second tab adapted to secure said locking member through said second aperture against said second band end portion; and an end section disposed proximate said second band end portion of said band extending beyond said first tab of said locking member.

2. The expandable band of claim 1 wherein said band body has a generally U-shaped cross section.

3. The expandable band of claim 2 wherein said first and second band end portions of said band body have said generally U-shaped cross section, and wherein said first band end portion of said band body has a narrower width than said second band end portion such that said first band end portion fits within said U-shaped cross section of said second band end portion.

4. The expandable band of claim 1 wherein at least said second band end portion of said band body has a generally U-shaped cross section, and wherein said first band end portion of said band body has a narrower width than said second band end portion such that said first band end portion fits within said U-shaped cross section of said second band end portion.

5. The expandable band of claim 1 wherein said band body includes a base portion and side portions extending from said base portion, and wherein said plurality of slots are disposed in said base portion of said band body.

6. The expandable band of claim 1 wherein said first band end portion includes a separate piece attached to said band body and having said plurality of slots.

7. The expandable band of claim 1 wherein said first tab forms an obtuse angle with respect to a plane tangential to said second band end portion of said band body.

8. The expandable band of claim 1 wherein said second band end portion includes a section having a U-shaped cross-section, and wherein said end section of said second band end portion extends as one piece from said section of said band body having said U-shaped cross-section.

9. The expandable band of claim 1 wherein said end section of said second band end portion includes a separate extension member attached to said second band end portion of said band body.

10. The expandable band of claim 1 further including an engaging element disposed on an inside surface of said band body, for engaging with a band expansion mechanism.

11. The expandable band of claim 10 wherein said engaging element includes a block attached to said inside surface of said band body.

12. The expandable band of claim 1 wherein said band body has a generally W-shaped cross section.

13. The expandable band of claim 12 wherein said first and second band end portions of said band body have said generally W-shaped cross.

14. The expandable band of claim 1 wherein said band body includes a base portion and at least two V shaped side portions extending from said base portion, and wherein said plurality of slots are disposed in said base portion of said band body.

15. The expandable band of claim 1 wherein said locking member includes at least one rib.

16. The expandable band of claim 1 wherein said locking member includes at least one protrusion.

17. The expandable band of claim 1 wherein said locking member is made from a material resistant to bending.

18. A sealing system comprising:

a resilient sealing member; and an expandable band comprising:

a band body having a first end and a second end, wherein said first end and said second end overlap to form a generally annular shape such that said expandable band contacts said resilient sealing member;

a plurality of slots disposed in said band body proximate said first end;

a first and a second aperture disposed in said second end;

a locking member having a first and a second tab disposed proximate a first and a second end portion of said locking member, said first tab adapted to extend through said first aperture in said second band end portion and into one of said plurality of slots to lock said expandable band at a desired diameter against said resilient sealing member, said second tab adapted to secure said locking member through second aperture against said second band end portion, wherein said resilient sealing member provides a resilient backing for said locking member; and an end section disposed proximate said second end of said band extending beyond said first tab of said locking member.

19. The sealing system of claim 18 wherein said band body has a generally U-shaped cross section.

20. The sealing system of claim 19 wherein said first and second band end portions of said band body have said generally U-shaped cross section, and wherein said first band end portion of said band body has a narrower width than said second band end portion such that said first band end portion fits within said U-shaped cross section of said second band end portion.

21. The sealing system of claim 20 wherein said end section of said second band end portion has a generally flat cross-section and extends as one piece from a section of said second band end portion having a generally U-shaped cross section.

22. The expandable band of claim 18 wherein said band body has a generally W-shaped cross section.

23. The expandable band of claim 18 wherein said first and second band end portions of said band body have said generally W-shaped cross.

24. The expandable band of claim 18 wherein said band body includes a base portion and at least two V shaped side portions extending from said base portion, and wherein said plurality of slots are disposed in said base portion of said band body.

25. The expandable band of claim 18 wherein said locking member includes at least one rib.

26. The expandable band of claim 18 wherein said locking member includes at least one protrusion.

27. The expandable band of claim 18 wherein said locking member is made from a material resistant to bending.

* * * * *